Oct. 30, 1928.
D. E. HENNESSY
TIRE BUILDING MACHINE
Filed May 2, 1924
1,689,831
3 Sheets-Sheet 2
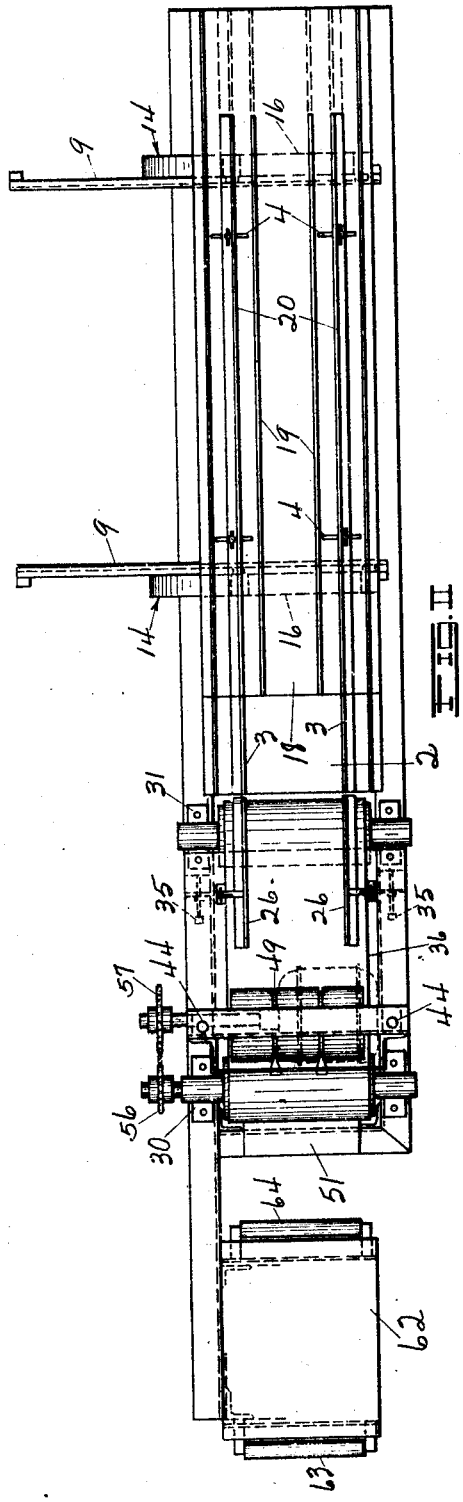
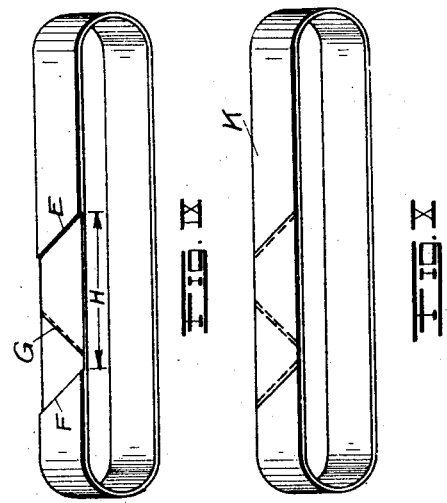
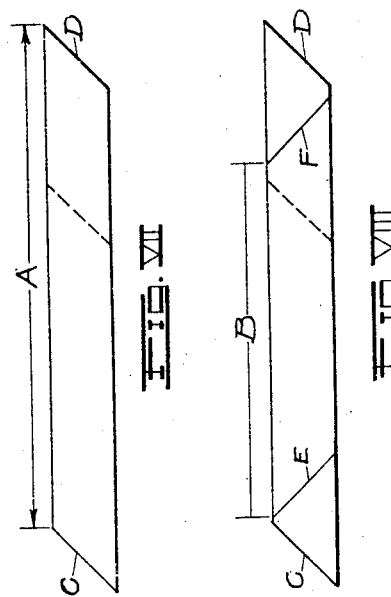
DANIEL E. HENNESSY
INVENTOR
BY
ATTORNEY

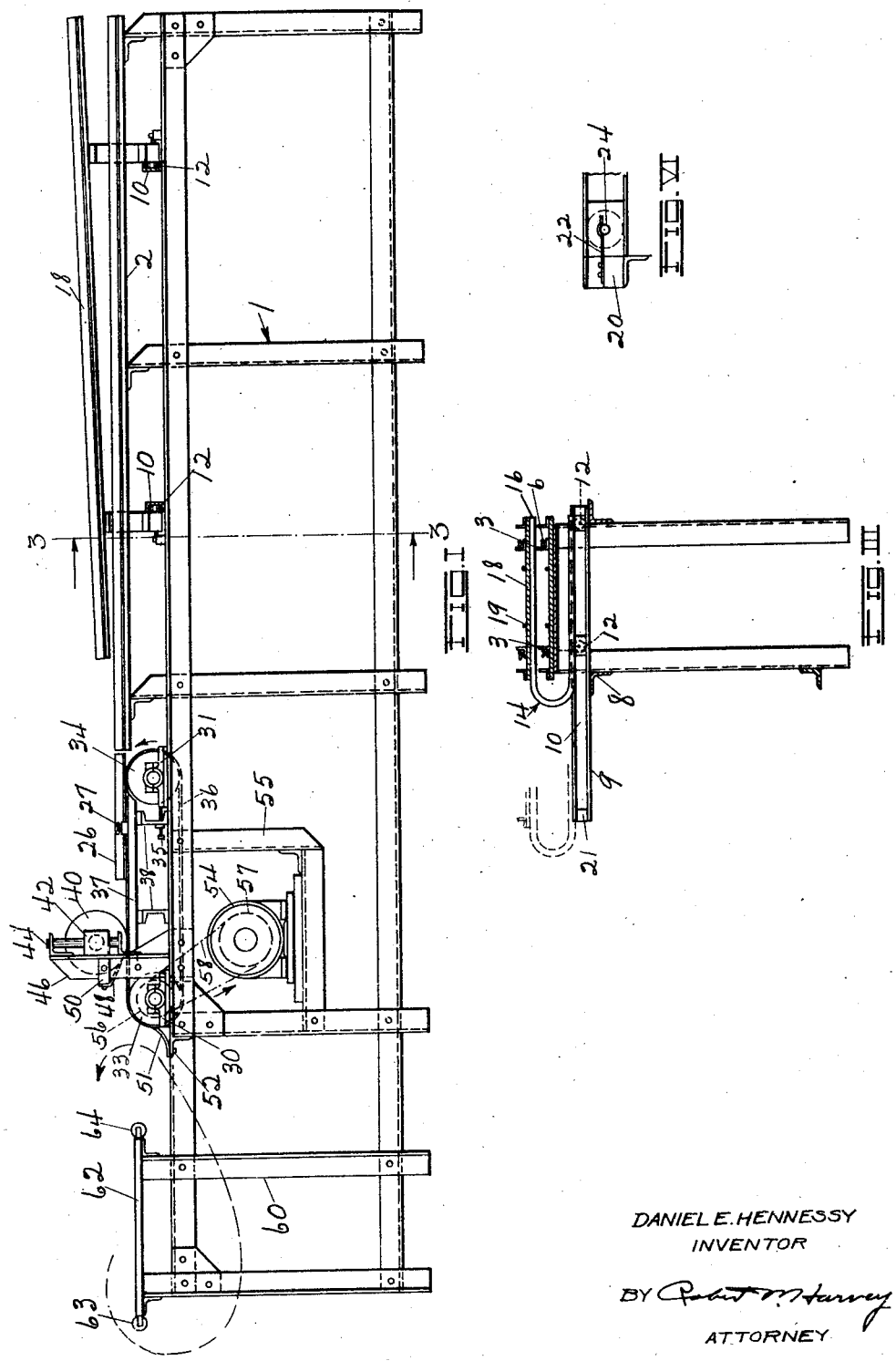

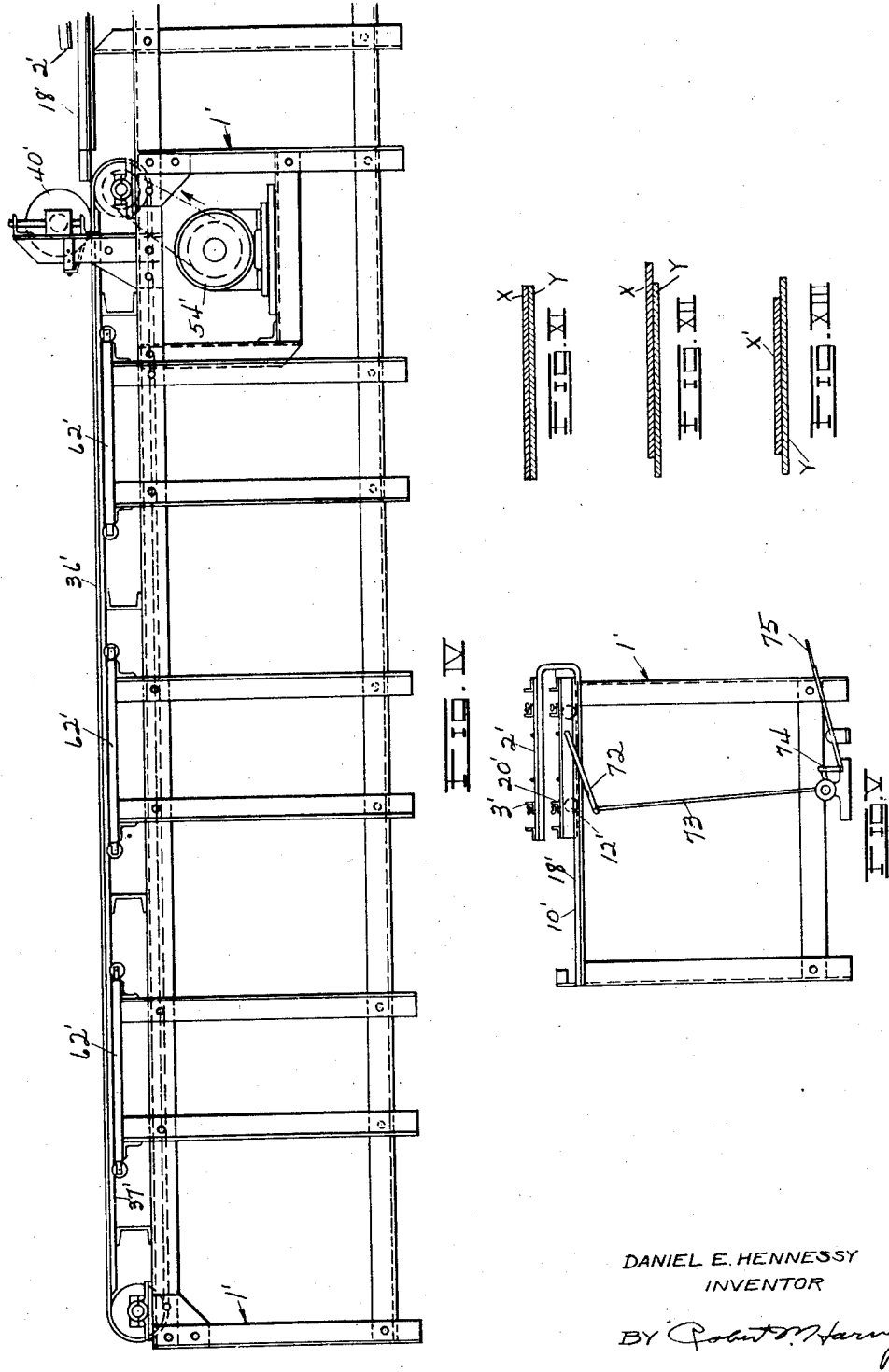

Patented Oct. 30, 1928.

1,689,831

UNITED STATES PATENT OFFICE.

DANIEL E. HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed May 2, 1924. Serial No. 710,529.

My invention relates to a device for forming multi-ply strips of material such as are used in building pneumatic tire casings. My invention may be used in forming unit tread elements and the like, but is particularly adapted to the manufacture of endless multiply bands of fabric used in building the tire carcass.

Bands of this character are customarily formed from strips of rubberized fabric cut to the desired width. The fabric is bias cut and of any suitable kind such as square woven fabric, cord fabric, or the socalled weftless cord fabric, all hereinafter generally referred to as fabric. In forming the bands it is highly desirable that the edges of the plies be in alignment and that they be uniformly pressed together, and it is one object of my invention to provide a device which will accurately align the fabric plies and uniformly unite them under conditions which will maintain their alignment. Other objects will appear from the specification and claims.

In the accompanying drawings which illustrate one embodiment of my invention, Figure 1 is a front elevation, Figure 2 is a plan view of the structure shown in Figure 1, Figure 3 is a vertical section on line 3—3 of Figure 1, Figure 4 is a front elevation showing an alternative form of receiving belt, Figure 5 is a view similar to that shown in Figure 2, but showing a modified form, and Figure 6 is a detail view of an element of the registering means, Figures 7 to 10 inclusive show diagrammatically the strips in forming the endless band, and Figures 11, 12, and 13 illustrate three types of bands which may be formed by my device.

Referring to the drawings, 1 designates the main frame of my device, upon which is supported a table 2, provided with longitudinal guides 3. These guides are transversely adjustable, by means of slots 4 and bolts 6, to accommodate different widths of fabric. Secured to frame 1 at 8 are rearwardly extending brackets 9 provided with tracks 10 in which wheels 12 of carriages 14 are adapted to travel. As shown in Figure 3, carriages 14 are provided with arms 16, which when the carriages 14 are positioned at the forward ends of channels 10 extend over table 2 and in parallel relation therewith. These arms support a second table 18, provided with adjustable guides 20 similar in every respect to guides 3. Both tables 2 and 18 are preferably provided with rods 19 to facilitate the passage of the fabric along their surface as will be later described. As will be evident table 18 may be moved backward along tracks 10 to clear table 2 as indicated in dotted lines in Figure 3, the backward movement of carriages 14 being limited by stops 21. The position of table 18 with respect to table 2 when the tables are in superposed position may be maintained by detents positioned at the forward end of tracks 10 and comprising spring fingers 22 adapted to engage pins 24 secured to carriages 14 as shown in Figure 6.

Mounted in suitable bearings 30 and 31 at the left hand end of frame 1, as viewed in Figure 1, are two pulleys 33 and 34 carrying a belt 36, the upper run of the belt being in line with the surface of table 2. Bearing 31 is longitudinally adjustable as shown at 35. Guides 26 are adjustably mounted at 27 to overlie a substantial portion of the belt, as is clearly shown in Figures 1 and 2. The belt 36 runs over a supporting table 37 supported between pulleys 33 and 34 on cross pieces 38 secured to frame 1.

A relatively heavy roll 40 rests upon belt 36 on table 37. Roll 40 is freely mounted in bearings 42 slidably supported on rods 44 carried in standards 46 secured to frame 1. Stripper fingers 48, riding in suitable grooves 49 in roll 40, are supported on a cross bar 50 secured to standards 46. A guiding and stripping member 51 is secured to frame 1 at 52 the free edge resting against the belt. Belt 36 is conveniently driven in the direction of the arrow in Figure 1 by a motor 54, supported by the main frame at 55, through sprockets 56 and 57 carried respectively by the shaft of pulley 33 and the motor shaft and connected by sprocket chain 58.

Main frame 1 is extended at 60 to form a support for a splicing table 62 which is provided at its ends with freely rotatable rolls 63 and 64 to facilitate splicing as later described.

The operation is as follows: With table 18 moved to rearward position, the operator places a strip of fabric, spliced to proper length A as shown in Figure 7 between the guides 3 of table 2 with the end extending onto belt 36. Table 18 is then drawn into position over table 2 and a length of fabric B as it comes from the cutter and which is usually of less length than A is placed between guides 20 thereon. As will be evident from Figure 3 the strips of fabric will be positioned in exact registration by guides 3 and 20. The operator then draws strip B forward along table 18 and presses its forward edge E into contact with strip A in the relation shown at the left of Figure 8. The fabric being rubberized adheres sufficiently to maintain this relation while the operator presses the ends against moving belt 36 which carries the forward ends under roll 40. Once engaged between belt 36 and roll 40 the strips are drawn thereby from their respective tables and pressed firmly together, the guides 3, 20, and 26 maintaining the alignment of the strips during this operation. The multi-ply strip thus formed is shown in Figure 8. As the plied strip leaves belt 36, the operator reverses it over table 62 bringing ends C and D together and splicing them at G as shown in Figure 9. Due to the fact that ply B was not spliced to length, a gap H is left and the operator proceeds to fill this gap with a piece of fabric of the necessary length, completing the endless band as shown at K in Figure 10.

It is sometimes desirable to employ a number of operators on a single machine and the modification shown in Figures 4 and 5 may in this case be preferable. In Figure 4 I illustrate an arrangement in which the upper table 2' is stationary and is supported by frame 1'. Lower table 18' is provided with rollers 12' running on tracks 10' supported by frame 1', and is adapted to be reciprocated thereon by link 72, lever 73, and link 74 from foot-pedal 75 in an obvious manner. Adjustable guides 3' and 20' are provided on the tables 2' and 18'. When this modified structure is employed I find it expedient to use a longer receiving belt as shown in Figure 4. In the latter figure the ends of the fabric receiving tables appear at 2' and 18'. Frame 1' is extended as shown to support a relatively long belt 36' moving over supporting table 37' secured to the main frame. A pressing roll 40' similar in all respects to roll 40 above described is mounted adjacent the ends of the fabric receiving table, and the belt is driven from a motor 54' supported by the frame 1'. At intervals along the belt splicing tables 62' are secured to the main frame. The operation of the modified form is similar to the operation previously described except that two operators are employed to lay the fabric, one for each table 2' and 18'. The operator at sliding table 18' splices the fabric strips to proper length, while the operator at table 2' lays a length without splicing and feeds the two plies onto belt 36' and under roll 40'. Operators at the various tables 63' remove the multi-ply strips from the belt and splice them to form endless bands as previously described.

It will be obvious that by variously setting guides 3 and 20 (or 3' and 20') any desired relation of the fabric plies may be secured, three types being shown in Figures 11, 12, and 13. Figure 11 shows coinciding plies X and Y of equal width, Figure 12 shows plies X and Y equal in width but offset, and Figure 13 shows a ply X' of less width than ply Y laid symmetrically thereon. It will be evident that bands of any desired number of plies may be formed. While I have described a particular manner of laying and splicing the fabric my device is in no way restricted thereto, for example both plies may be spliced to length before being laminated.

I claim:

1. A device of the character described comprising relatively movable tables adapted to support strips of material in predetermined superposed relation and means to simultaneously draw said strips from said tables.

2. A device of the character described comprising relatively movable tables adapted to support strips of material in predetermined superposed relation, means to simultaneously draw said strips from said tables and form them into a single laminated strip and means to maintain said predetermined relation during the latter operation.

3. A device of the character described comprising two relatively movable tables, adjustable guides on said tables, a belt adapted to receive strips of material from said tables and a relatively heavy presser roll, mounted for free vertical movement, resting on the surface of said belt.

4. A device of the character described comprising a stationary table, a movable table normally positioned to permit free access to the stationary table, means on each of the tables to accurately position strips of material thereon, the movable table adapted to be moved to position the strip of material supported thereon in a predetermined superposed relation to the strip of material on the stationary table.

5. A device of the character described comprising a stationary table, tracks positioned below and running at right angles to the length of the stationary table, horizontally positioned U-shaped supports the lower members of which are provided with rolls running on said tracks, a second table mounted on the upper members of the U-shaped supports, the upper end lower members of said supports adapted to embrace the stationary table to position said second table in predetermined superposed relation to said stationary table.

6. A band building device comprising a driven belt, relatively stationary; means, positioned at one end of the belt, adapted to support a plurality of strips of fabric in the relative position they are to occupy in the finished band and to deliver the so-positioned strips to the belt simultaneously, and a presser roll beneath which the strips are carried by the belt.

7. A device of the character described comprising two relatively movable tables, a belt adapted to receive strips of material from said tables, and a relatively heavy presser roll, mounted for free vertical movement, resting on the surface of the belt.

8. A band building device comprising a driven belt, relatively stationary means, positioned at one end of the belt, adapted to support a plurality of superposed strips of band material and to deliver the latter to the belt, and a presser roll beneath which the strips are carried by the belt.

In testimony whereof I have signed my name to the above specification.

DANIEL E. HENNESSY.